(12) United States Patent
Mattila et al.

(10) Patent No.: US 7,191,216 B2
(45) Date of Patent: Mar. 13, 2007

(54) SYSTEM AND METHOD FOR CONTROLLING ACCESS TO DOWNLOADABLE RESOURCES

(75) Inventors: Marko Mattila, Tampere (FI); Seven Eerola, Pirkkala (FI); Natalia Nedzelskaia, Tampere (FI); Jukka Heiska, Helsinki (FI); Jyri Jokinen, Tampere (FI)

(73) Assignee: Nokia Corporation, Espoo (FI)

( * ) Notice: Subject to any disclaimer, the term of this patent is extended or adjusted under 35 U.S.C. 154(b) by 616 days.

(21) Appl. No.: 09/970,530

(22) Filed: Oct. 3, 2001

(65) Prior Publication Data

US 2003/0065777 A1    Apr. 3, 2003

(51) Int. Cl.
*G06F 17/60* (2006.01)
*G06K 5/00* (2006.01)

(52) U.S. Cl. ............ 709/205; 709/217; 709/204; 709/203; 709/206; 705/54; 713/200; 713/201; 713/202

(58) Field of Classification Search ............ 709/218, 709/223–225, 249, 246; 370/230, 235; 707/10, 707/101, 110; 705/54; 713/165
See application file for complete search history.

(56) References Cited

U.S. PATENT DOCUMENTS

| | | | |
|---|---|---|---|
| 5,542,046 A | 7/1996 | Carlson et al. | |
| 5,910,987 A * | 6/1999 | Ginter et al. | 705/52 |
| 6,006,332 A | 12/1999 | Rabne et al. | |
| 6,055,637 A | 4/2000 | Hudson et al. | |
| 6,085,976 A * | 7/2000 | Sehr | 235/384 |
| 6,112,085 A * | 8/2000 | Garner et al. | 455/428 |
| 6,308,273 B1 | 10/2001 | Goertzel et al. | |
| 6,314,408 B1 * | 11/2001 | Salas et al. | 705/54 |
| 6,317,783 B1 * | 11/2001 | Freishtat et al. | 709/218 |
| 6,389,541 B1 | 5/2002 | Patterson | |
| 6,604,106 B1 * | 8/2003 | Bodin et al. | 707/101 |
| 6,631,416 B2 * | 10/2003 | Bendinelli et al. | 709/227 |
| 6,892,201 B2 * | 5/2005 | Brown et al. | 707/9 |
| 2002/0038425 A1 | 3/2002 | Kanno | |

* cited by examiner

*Primary Examiner*—David Wiley
*Assistant Examiner*—Jude Jean-Gilles
(74) *Attorney, Agent, or Firm*—Hollingsworth & Funk, LLC

(57) ABSTRACT

A system and method for controlling access to downloadable resources on a network. Content download requests are received from a network service, where the content download request includes access information. An access ticket is created based on the access information, which includes various ticket fields to store access parameters parsed from the access information. The access ticket associated with a transaction request is retrieved using a ticket identifier accompanying the transaction request. A download of desired content is authorized based on the access parameters of the retrieved access ticket. When authorized, the content is delivered to a user terminal identified by the access ticket.

45 Claims, 7 Drawing Sheets

SYSTEM AND METHOD FOR CONTROLLING ACCESS TO DOWNLOADABLE RESOURCES

FIELD OF THE INVENTION

The present invention relates generally to network communications systems, and more particularly, to a system and method for controlling access to downloadable services in a network.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to consumers. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. 2G systems, such as Global System for Mobile communications (GSM) and Personal Communications Services (PCS), use digital radio technology for improved quality and a broader range of services over first generation mobile technologies. 3G, or third generation, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer.

With the introduction of new mobile services such as WAP, Multimedia Messaging Service (MMS), calendar and contact synchronization, as well as a multitude of other possibilities, and the ever-increasing addition of new network services, the number of servers and portals providing services for mobile and landline network terminals continues to expand. Further, there is an increasing number of features associated with these services, such as support for multimedia, location-based services, electronic payments, etc. Various manners for charging for such services are also an integral, and growing, part of network services, as postpaid, pre-paid, hot-billing, and other payment mechanisms are continually deployed to meet growing and changing consumer needs.

Setting configuration parameters for new, upgraded, and/or accessed services is generally referred to as provisioning. Conventional provisioning systems required that a retail establishment provision the terminal for the user. This, however, is inconvenient for the user. Further, if the user decided to purchase a different terminal or upgrade services, the user was forced to return to the dealer to provision, or re-provision the terminal. More recent provisioning systems have made it possible to allow the user to initiate provisioning from the device. For example, a user may manually initiate provisioning from the device to be provisioned. In other provisioning systems, a remote server device may instigate a communications session with a provisioning server device, and provide the provisioning server with provisioning information.

However, for controlling access to such services, existing control mechanisms are not easily maintained in view of an ever-changing network environment. Currently, limiting access to resources in a network environment where variables are likely to change is problematic. Further, the effort, time, and cost of manually provisioning and controlling access to available services in current networking environments is unduly prohibitive. Extensibility is important, as the relationship between the service and network elements such as storage, charging, etc., may change. For example, new access and payment methods may emerge, and it is important that access to such new resources is handled efficiently.

The use of access control lists has been used in an attempt to address access to resources. For example, U.S. Pat. No. 6,055,637 discusses resource access control in user sessions and how a session ID is used to handle access control to resources. One session ID is assigned to one person, and when the session is terminated, the session ID is invalidated. However such access control lists are not extensible or transferable, and do not allow the flexibility required for various payment processes.

Accordingly, there is a need in the network communications industry for a manner of controlling access to downloadable network resources, while providing expandability, automation, and transferability. The present invention provides a solution to these and other shortcomings of the prior art, and offers additional advantages over the prior art.

SUMMARY OF THE INVENTION

The present invention is directed to a system and method for controlling access to downloadable services in a network.

In accordance with one embodiment of the invention, a method is provided for controlling download access to content available via a network service. The method includes receiving a content download request from the network service, where the content download request includes access information. An access ticket is created based on the access information. The access ticket includes various ticket fields to store access parameters parsed from the access information. The access ticket associated with a transaction request is retrieved using a ticket identifier accompanying the transaction request. A download of desired content is authorized based on the access parameters of the retrieved access ticket. When authorized, the content is delivered to a user terminal identified by the access ticket.

In accordance with another embodiment of the invention, a download server is provided for controlling access to downloadable content via a network. The download server includes a storage module for storing ticket objects. A service handler receives service requests to download content from a network service. The service handler creates the ticket objects for storage in the storage module, where the ticket object includes access parameters based on information provided in the service request. The service handler delivers a corresponding ticket address of the ticket object in the storage module to the network service. The download server also includes a transaction handler to receive download transaction requests identifying the ticket address. The transaction handler retrieves the ticket object from the storage module based on the ticket address, and authorizes a download transaction based on the access parameters of the ticket object. The transaction handler delivers the content to a user terminal identified by the ticket object upon authorization of the download transaction.

In accordance with other embodiments of the invention, a network system is provided for controlling access to downloadable content via a network. The system includes a user terminal to initiate content download requests, and a network service module to receive the content download requests and initiate service requests in response to the download requests. A download server which receives the service requests is also provided. The download server includes a storage module for storing ticket objects, and a service handler to create the ticket objects for storage in the storage module. The ticket object includes access parameters based on information provided in the service request. The service handler delivers a corresponding ticket address of the ticket object in the storage module to the network service. The download server also includes a transaction handler to receive download transaction requests identifying the ticket address. The transaction handler retrieves the ticket object from the storage module based on the ticket address, and authorizes a download transaction based on the access parameters of the ticket object. The transaction handler delivers the content to a user terminal identified by the ticket object upon authorization of the download transaction.

In accordance with another embodiment of the invention, a method is provided for controlling download access to a terminal to content available via a network service. An access ticket based on user access information provided by the network service is created. The terminal is notified of a ticket address corresponding to a stored location of the access ticket. A transaction is created upon receipt of a transaction request including the ticket address from the terminal, and the content requested by the terminal is provided for each one or more transaction request identifying the transaction sent from the terminal.

The above summary of the present invention is not intended to describe each illustrated embodiment or implementation of the present invention. This is the purpose of the figures and the associated discussion which follows.

DETAILED DESCRIPTION OF THE ILLUSTRATED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Generally, the present invention is directed to a system and method for controlling access to downloadable resources on a network. In accordance with the invention, a provisioning control document or "ticket" is used for controlling access to resources through a special download server. The download server may be implemented integrally with pre-existing network server elements, or alternatively may be a separate network server element. The tickets are objects that contain certain user identification and user access rights, which are session-independent and have a life cycle defined by the access rights.

Figure 1:
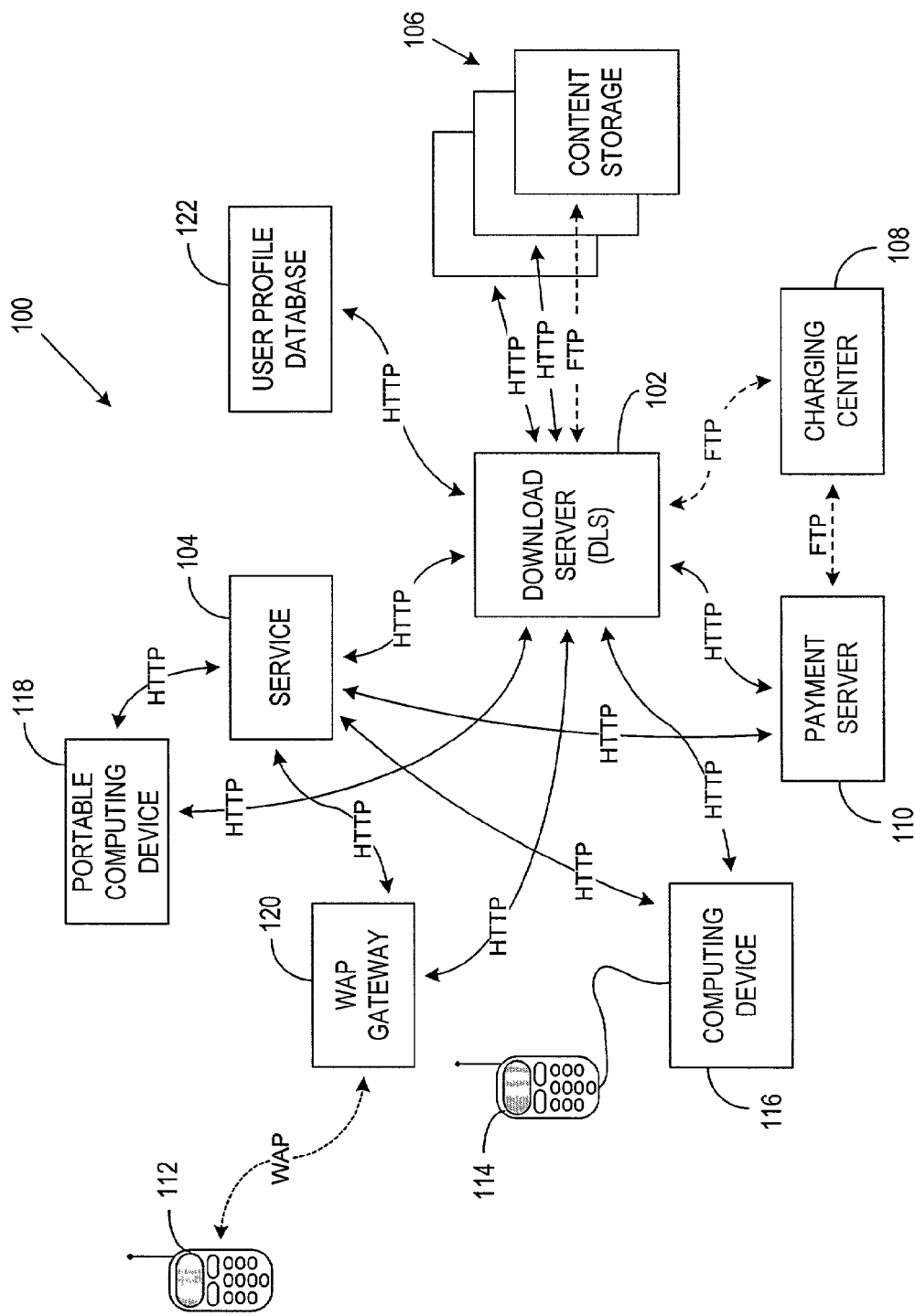
FIG. 1 is a diagram illustrating an exemplary networking environment employing the principles of the present invention.

FIG. 1 is a diagram illustrating an exemplary networking environment 100 employing the principles of the present invention. A significant feature of the network environment of FIG. 1 is the download server (DLS) 102. One aspect of the invention involves the use of a provisioning control document, referred to herein as a "ticket," for controlling access to resources through a special server such as the DLS 102. The DLS 102 serves as an access control and charging proxy in accordance with the invention.

The networking environment 100 in which the present invention is applicable generally includes at least a service 104, content storage 106, a charging solution such as the charging center 108 and/or payment server 110, and the DLS 102. In addition to these elements, the access control system and process involves the end user(s) that are accessing resources, represented for purposes of example by various terminals. These exemplary terminals include mobile terminal 112, terminal 114 which can be coupled to a computing device 116, portable computing device 118, and any other mobile or landline terminal that can be adapted for operation in the network 100. For example, the portable computing device represents any portable wireless or wireline terminal, such as a personal digital assistant (PDA), a notebook or laptop computer, or any other type of terminal.

Some wireless terminals, such as wireless terminal 112, may interface with the network environment 100 via an element that appropriately interfaces disparate networks or protocols. For example, a request for information may be transmitted from a Wireless Application Protocol (WAP)-compliant terminal 112 in a wireless network to a WAP gateway 120 that bridges the wireless and wireline networks. WAP is a technology that integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

The request from the WAP terminal 112 is provided by way of a Uniform Resource Locator (URL), generally using the Wireless Session Protocol (WSP) which is essentially a binary version of the HyperText Transfer Protocol (HTTP). The URL is an address to the requested information that is available on the network 100, such as a landline network including an intranet or the Internet. The WAP gateway 120 receives the URL from the device 112, and converts the request to a protocol used on the opposite side of the WAP gateway 120, such as HTTP. The gateway 120 forwards the converted URL to the appropriate destination, and in some cases provides additional information about the WAP device through HTTP headers such as the subscriber number of a WAP-capable cellular phone, its cell ID, location, etc. The WAP gateway 120 also converts content directed to the WAP terminal 112 into a format that the WAP terminal 112 can understand, such as binary Wireless Markup Language (WML).

Content may also be downloaded to computers or workstations, such as the computing device 116. The workstation 116 can serve, for example, as a game front end, where the game (or other application) can have both mobile and office participants. Further, the content may first be downloaded to a workstation such as computing device 116, and then transferred to the terminal 114 via a cable, if the terminal 114 does not support over-the-air (OTA) provisioning. These are merely examples of various manners in which content may require downloading, and a multitude of other possibilities exist.

The network 100 may also include a user profile database 122. This database 122 may be used to store and supply user-specific data, such as a Mobile Station ISDN/PSTN Number (MSISDN). The MSISDN is one example of certain subscriber information, and in general is a mobile number used by GSM/DCS networks that contains information such as the country code, national destination code, HLR identifier and a subscriber number. Other information may also be stored in the user profile database 122 as required. For example, this information can include profile data, such as whether the user wants to download monophonic or stereophonic versions of a digital audio file.

The service 104 represents the portal that facilitates browsing of service content and thus enables discovery of the downloadable items. The service 104 also initiates the download transactions, by sending initiation information to the DLS 102 and redirecting the end user to the DLS 102. The service 104 knows what type of content is available and can inform the terminal where that content can be found. It is responsible for transferring the download transaction to DLS 102 (e.g. via redirect). Downloadable content is accessed through the DLS 102, which receives requests from the terminal in HTTP format in one embodiment, and then selects the correct content from possible multiple variants stored in the content storage modules 106.

The exemplary networking environment 100 shown in FIG. 1 also illustrates examples of protocols that may be used to communicate between the illustrated network elements. These protocols include HTTP, WAP, and FTP (file transfer protocol). The communication links using these protocols are illustrated for purposes of example, although the present invention may be implemented in any networking environment using different protocols.

The download server (DLS) 102 is capable of performing a variety of functions associated with the network 100, and facilitates the access control in accordance with the present invention. The DLS 102 can support various charging alternatives, such as postpaid, hot-billing, and prepaid charging. Various parties hope to profit from applications and content loaded to terminals. For this reason, operators want to ensure that download transactions can be charged for.

The DLS 102 provides facilities for charging. Prepaid charging involves effecting a debit to a user's prepaid account balance substantially contemporaneously with the use that gives rise to the debits. In the prepaid context, the service 104 may request the charging center 108 to reserve credit for the download transaction, or the DLS 102 may request the charging center 108 to reserve credit for the download transaction. Postpaid charging involves billing the customer for service usage at a later time, generally aggregated over a period of time. In a postpaid scenario, an event record or "call-detail record" (CDR) is created when download operation has been completed. The CDR includes record the details of the transaction or "call." The call/transaction traditionally includes voice transmissions, but is also generally used to refer to transmissions of data, video, sound, and other transmittable content. The information in a CDR generally depends on the type of transmission, and the payment option selected. For example, in the context of postpaid services, usual information associated with a CDR may include start time of call, end time of call, duration of call, originating number, terminating number, number of bytes transferred, URL visited, etc. The CDR may be stored until time of billing, and CDR files are periodically sent to the charging center 108 to be processed.

One manner of supporting charging is by writing these CDRs so that the charging center 108 can process them. The amount specified is then either deducted from a prepaid account, or added to the subscriber's bill. Another manner of supporting charging is through a payment solution that involves the payment server 110. The payment server 110 manages the transaction flow between consumers, merchants and the clearing channels. It can record payment events, validate consumer and merchant identities, and process the transactions towards financial institutions and billing systems. This payment solution provides a uniform interface to services for accessing multiple charging and billing mechanisms. In this manner, the service can require payment from the end-user before the download transaction is transferred to the DLS 102. The DLS 102 may also provide management system integration support, and intelligent content selection.

One function of the DLS 102 associated with the present invention is download transaction handling. The DLS 102 supports the receipt of download transaction orders (i.e., transaction initiations) from various services, and authorizes the transactions as well as monitors and controls the life cycle of the initiated orders. For example, the life cycle for an initiated order may be a time frame, a number of downloads such as three downloads for a specific user, or other parameter defining the life cycle.

The DLS 102 provides an interface for the services to initiate the transaction. When the service 104 initiates a transaction, it provides information to the DLS 102 including the identify of the end-user, the identity of the downloadable content, and other transaction-specific information. In accordance with the present invention, this information is used to create a control document referred to herein as a "ticket" at the DLS 102. As will be described more fully below, the DLS 102 is capable of ensuring that content downloads specified by the tickets are handled in a reliable fashion, and that the transaction is completed as it should be. This also means that once the service has initiated a ticket, the end-user may be allowed to access content throughout a life cycle, e.g., allowed to access 1, 2, . . . n files 1, 2, . . . x times (where n, x represent a number specified by the service.)

Figure 2:
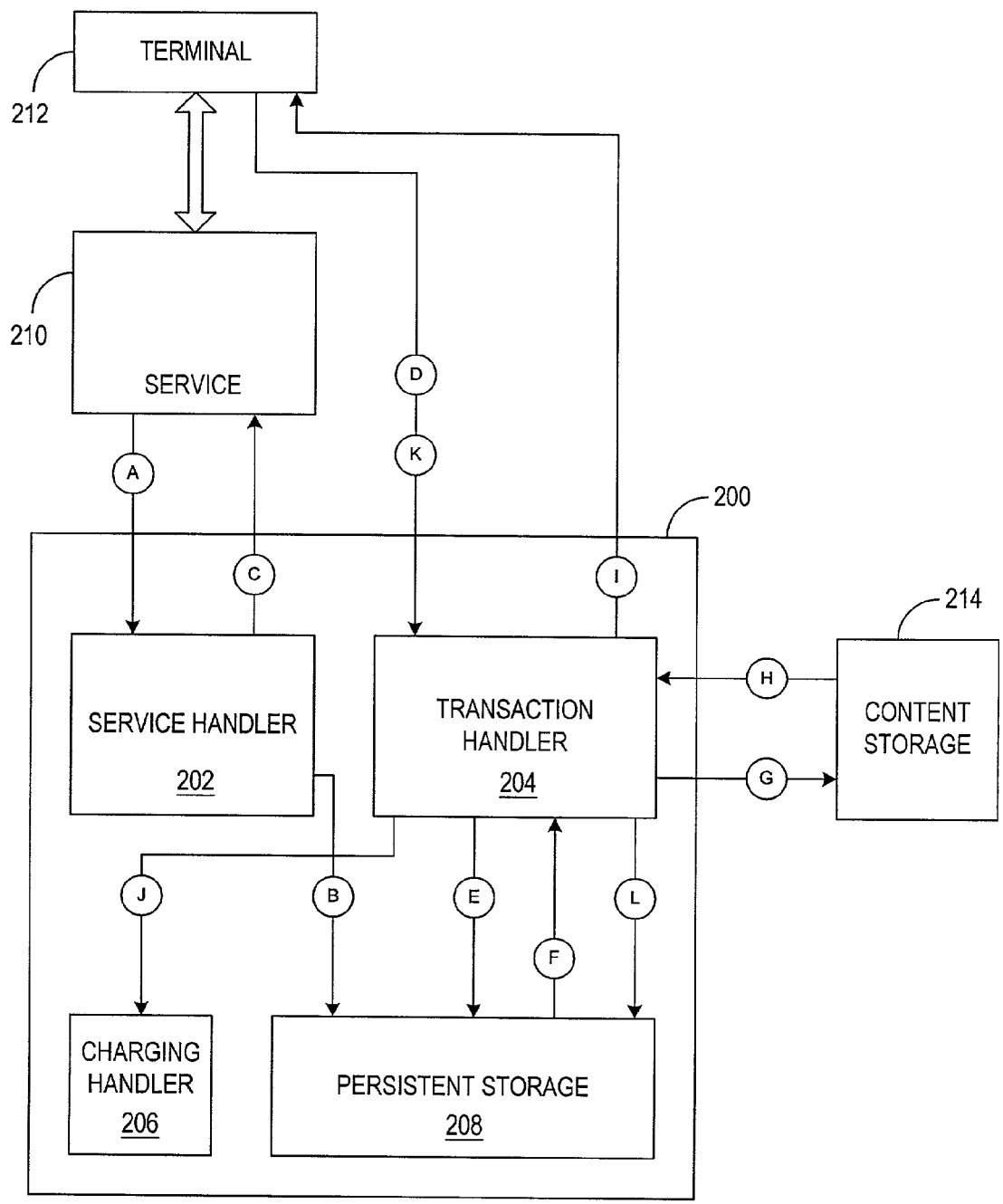
FIG. 2 is a block diagram of an exemplary embodiment of a download server (DLS) in accordance with the principles of the present invention.

FIG. 2 is a block diagram of an exemplary embodiment of a download server (DLS) 200 in accordance with the principles of the present invention. The DLS 200 illustrates various functional modules associated therewith, including the service handler 202, transaction handler 204, charging handler 206, and persistent storage 208. While the persistent storage module 208 is shown as part of the DLS 200, it may alternatively be a separate, external storage module. Further, the storage 208 may be volatile or non-volatile storage, however in a preferred embodiment of the invention this storage is non-volatile.

In the DLS 200, the service handler 202 manages download transaction requests. In addition to handling the transaction requests, the transactions themselves must be processed, which is performed by the transaction handler 204. The manner in which the DLS 200, the service handler 202, and the transaction handler 204 manage these transactions is through the use of the aforementioned tickets.

An exemplary manner in which download transaction requests are managed is now described in connection with FIG. 2. The service handler 202 at the DLS 200 receives a request from the service 210, as shown on the request line "A." The request indicates that the user of the terminal 212 is requesting to download content, regardless of whether the content download is specifically requested at the terminal 212 or is otherwise "pushed" to the terminal 212. In one embodiment, this request is sent as an HTTP request. The service handler 202 authenticates the particular service 210, and sends error messages if authentication was unsuccessful. If successfully authorized, the service handler 202 parses and validates the request document accompanying the request, which in one embodiment is an XML document. If the data is found to have errors or is otherwise incorrect, the service handler 202 sends error messages back to the service 210 indicating the error.

Assuming the data in the service request is found to be correct, the service handler 202 creates a ticket in accordance with the invention. The ticket is based on the data sent in the request, which can include various types of information. The ticket associated with the request is stored in the persistent or otherwise non-volatile storage 208, as shown on path "B." The service handler 202 then creates a document, such as an XML document, that includes an address (e.g., URL) of the ticket in the persistent storage 208, and delivers this response to the service 210 so that the ticket URL may be used by the terminal 212 in making transaction requests. In one embodiment, this response is sent via HTTP, as shown in path "C."

In this manner, a user request to download content is first acted upon by the service handler 202, which ultimately creates an access control ticket based on data in the request. The ticket is stored, and an address identifying where that ticket is stored is returned to the service.

Once the access control ticket has been created and stored, the transaction itself (i.e., content download) is handled. When the service 210 is notified of the URL or other address where the corresponding ticket is stored, the terminal 212 can initiate the download transaction which includes the ticket URL. The terminal issues a request, such as an HTTP request, to initiate the transaction. The transaction handler 204 receives the request, as shown by path "D." It should be recognized that such download transactions can include one or more requests from the terminal 212 to the transaction handler 204. In the case of multiple requests, the first request points to the ticket URL. Second and subsequent requests from that terminal 212 point to the HTTP session, which is used to assign HTTP requests to transactions. The HTTP session can be based on cookie technology, URL encoding, or the like. Cookie technology is based on HTTP headers sent between the terminal 212 and the DLS 200. URL involves encoding the unique session identifier to each URL returned to the terminal 212. When the last HTTP request related to the transaction is received, the transaction entry is added to the persistent storage 208 and ticket information is updated, as described more fully below.

The transaction handler 204 receives the download transaction request, and parses a ticket identification (i.e., ticket ID) from the ticket URL accompanying the request. A fetch request for the corresponding ticket object is sent to the persistent storage 208, as shown on line "E," and the targeted ticket object is provided by the persistent storage 208 to the transaction handler 204 in response thereto as shown on path "F." The transaction handler 204 determines whether the ticket is valid, and if so, generates a transaction identifier for this transaction. The transaction handler 204 also validates that the received request is authorized to use the received ticket.

The transaction handler 204 utilizes facilities within the DLS 200 to fetch the targeted file from content storage 214. The transaction handler 204 may itself include a storage control module to carry out this memory operation, or a separate storage control module may be called upon by the transaction handler 204 to perform this duty. In any case, a fetch request is provided by the DLS 200 to the content storage 214 as shown by path "G," and the requested file is provided back to the DLS 200 as shown by path "H." The requested file is provided by the DLS 200 back to the terminal 212 as shown on path "I." A number of files corresponding to multiple requests may be provided in connection with a download transaction, where multiple requests are associated with such a download transaction.

Further, the transaction handler 204 manages the creation of charging records. The transaction handler 204 calls the charging handler 206, as seen by path "J." The charging handler 206 works in connection with charging and billing elements, such as the charging center 108 and/or payment server 110 shown in FIG. 1, to create the appropriate charging record(s). In the case of multiple requests associated with a download transaction, the charging handler 206 is called in connection with each request.

After the terminal 212 receives the requested files from the one or more requests from the terminal 212, and when the last request related to the transaction is received, the transaction entry is added to persistent storage 208 and the ticket information is updated, as depicted on path "L." One example of this last request from the terminal 212 is a confirmation message "K" (e.g., HTTP request) pointing to the transaction identifier (transaction ID). The confirmation message "K," being an example of a final request from the terminal 212, is shown on the same path as the other requests associated with the download transaction, as was identified by the identifier "D." The transaction handler 204 receives and authorizes this request, and checks that the confirmation message associated with the request is a valid message from the terminal 212. As described above, the transaction entry is stored to the persistent storage 208, and the ticket information is modified and stored in the persistent storage 208 as well.

At any given time, therefore, the ticket includes all information concerning the remaining number of allowed transactions for that user/terminal, and concerning any other analogous access parameters. Thus, access is controlled through the use of this modifiable ticket that facilitates extensibility and automation. New service parameters and/or new user access rights may be conveniently updated in the corresponding tickets. Parameters of the ticket define the life cycle of the ticket, which is independent of particular user sessions and therefore capable of spanning multiple user sessions. Further, several users can have the same ticket ID, and a delivery transaction (i.e., download session) is created based on the ticket ID. Such tickets may also be transferred if such need arises. For example, tickets can be moved from one server to another, while preserving the privileges specified therein.

Figure 3:
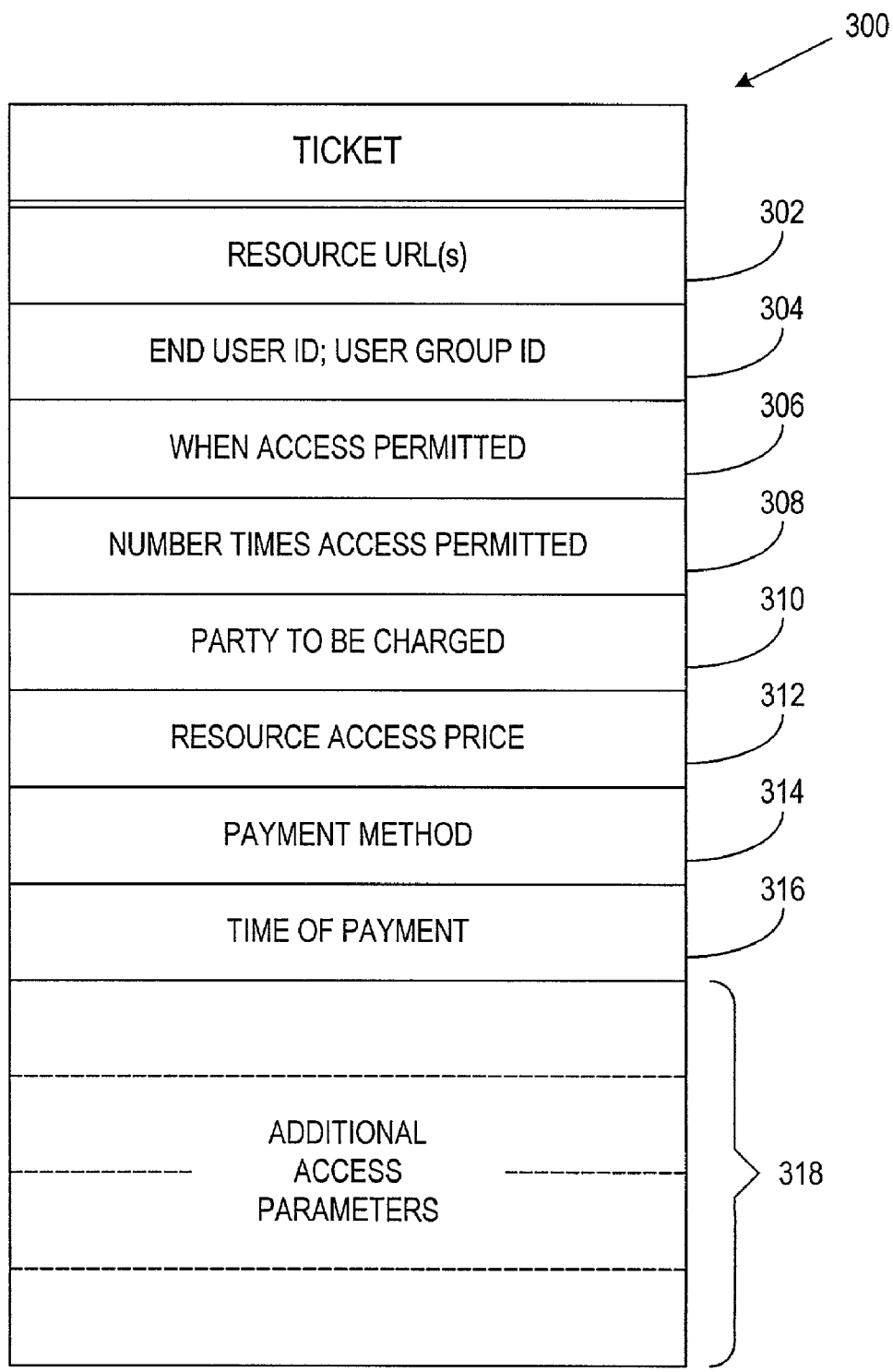
FIG. 3 is a diagram illustrating an example of a ticket and the corresponding privileges and access parameters that may be maintained therein.

FIG. 3 is a diagram illustrating an example of a ticket 300 and the corresponding privileges and access parameters that may be maintained therein. The ticket 300 shown in FIG. 3 provides examples of the access parameters that may be used to control download access, but the invention is not limited to those represented in FIG. 3. Rather, the ticket may include any number of different access parameters that may be useful in regulating a user's access to downloadable content provided to the user's terminal through a service.

Referring to FIG. 3, a first representative ticket parameter is a resource address or URL 302. This identifies the particular resource desired. The ticket 300 also includes the identification of the end-users or user groups that are allowed to access the resources, as shown at ticket block 304. Different manners of identifying end-users are possible, including using determined user names, subscriber identifiers such as an International Mobile Subscriber Identity (IMSI), or analogous user identifier. End-users can also be identified by terminal equipment identification, such as a Mobile Station ISDN/PSTN Number (MSISDN), an International Mobile Equipment Identity (IMEI), or analogous device identifier. The ticket 300 may also include information 306 as to when the access is allowed, and information 308 identifying how many times access is allowed. These are access parameters that indicate the particular access rights afforded to the user. Other information may also be provided in the ticket 300, such as an identification 310 of the party to be charged where that party is different than the user accessing the content, the resource price 312, the payment method 314, and the time of payment 316 in relation to the actual access. Any number of additional access parameters or information can also be included in the ticket, as represented by the additional access parameters 318.

Figure 4:
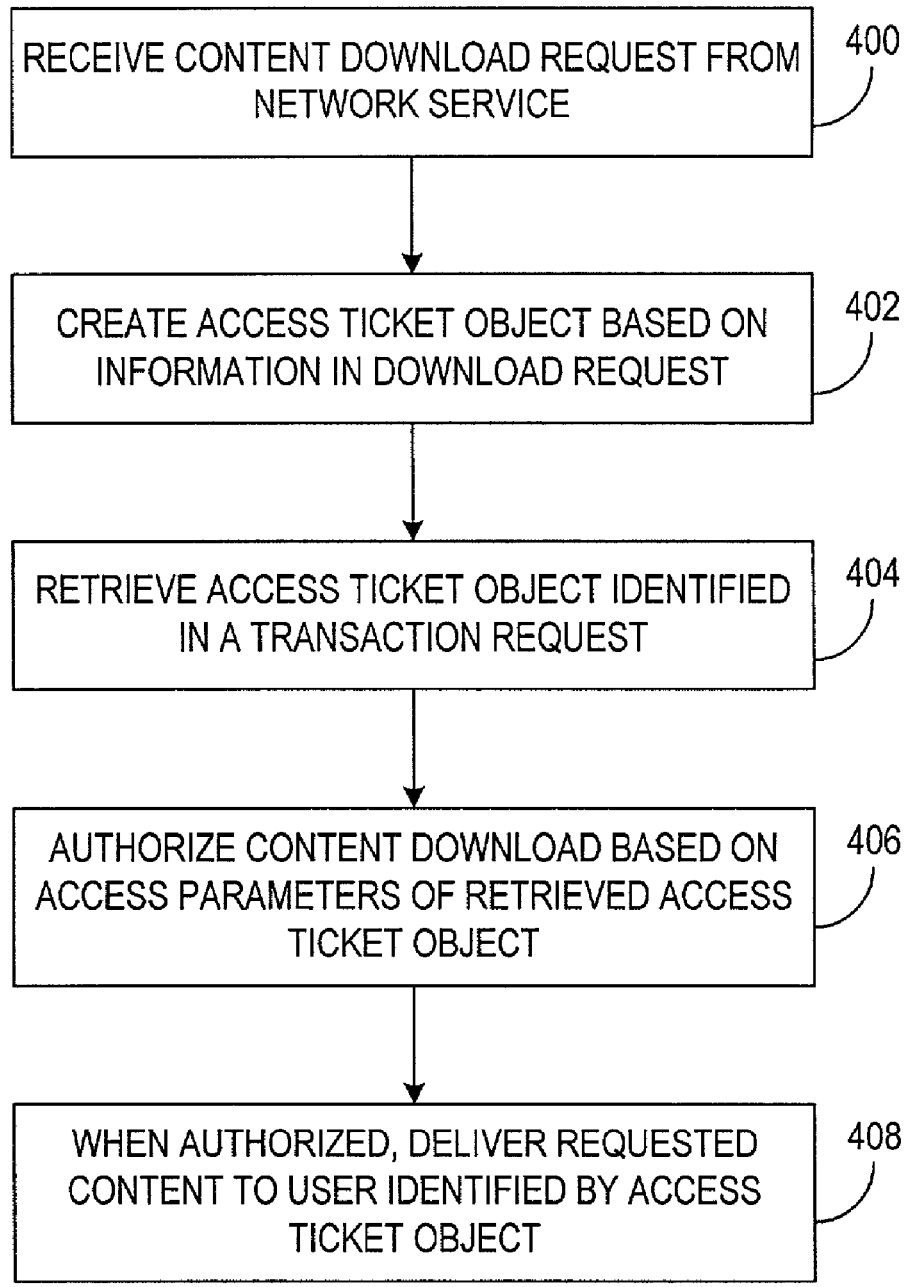
FIG. 4 is a flow diagram illustrating one embodiment of a method for controlling access to downloadable resources in accordance with the present invention.

FIG. 4 is a flow diagram illustrating one embodiment of a method in accordance with the present invention. As shown at block 400, a content download request is received by the download server (DLS) from a network service from which a user is seeking to download information. A ticket, referred to in this embodiment as an access ticket object, is created 402 based on information provided in the download request. For example, the request to the DLS includes information identifying the requesting user, as well as other information such as that identified in the ticket fields of FIG. 3. The ticket may be stored, and upon receipt of a transaction request, the ticket identified by that transaction request is retrieved 404. The download is authorized 406 based on the access parameters of the retrieved ticket. For example, if ticket fields indicate that the user(s) associated with that ticket is allowed one download, then one content download may be authorized for that user(s). When authorized, the requested content is delivered 408 to the terminal of the requesting user, which is identified by the ticket.

Figure 5:
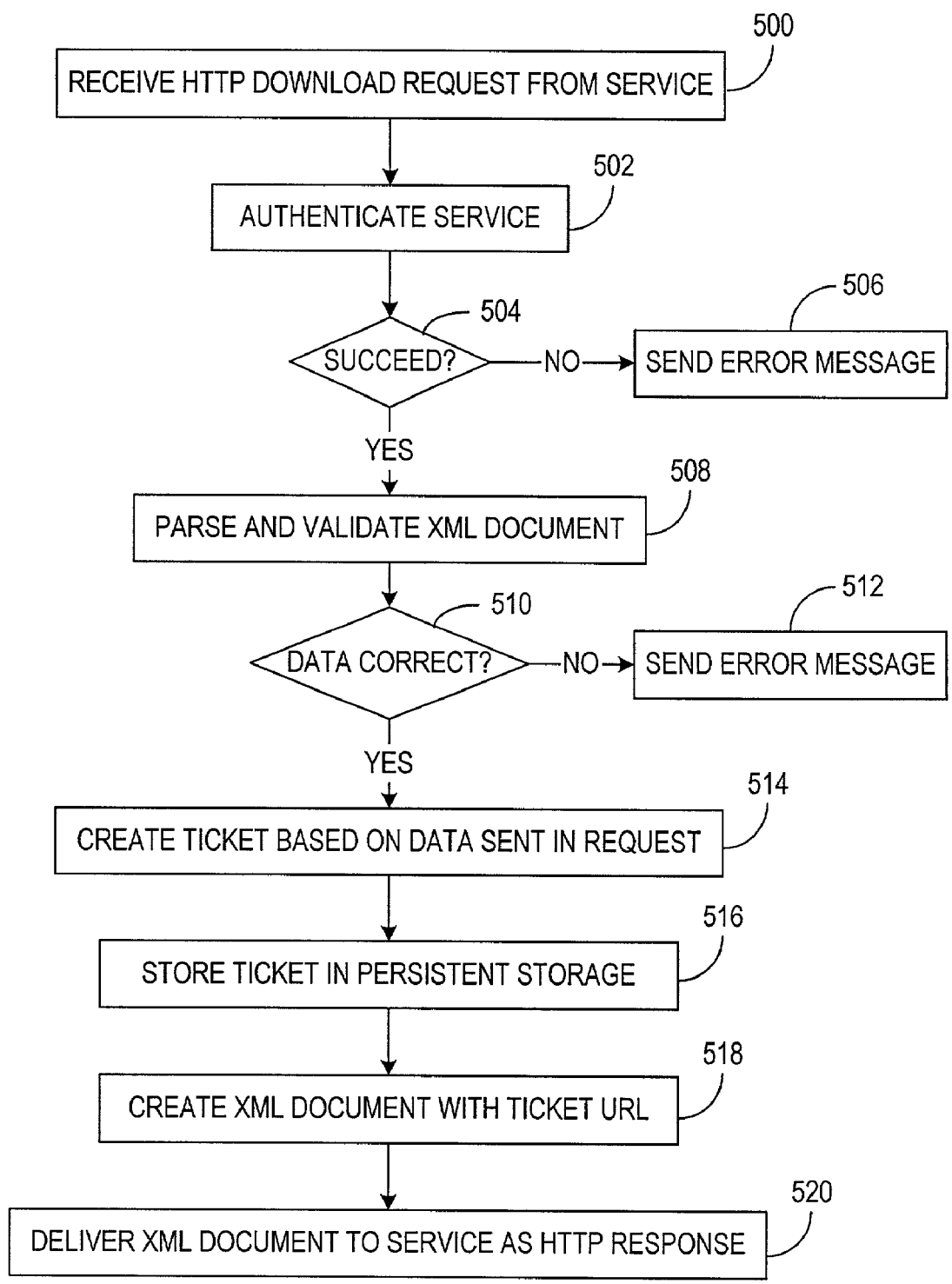
FIG. 5 is a flow diagram of an exemplary embodiment of actions performed by the service handler of the DLS.

FIG. 5 is a flow diagram of an exemplary embodiment of actions performed by the service handler of the DLS. The service handler receives a download request, such as an HTTP request, from the service as shown at block 500. The service is authenticated 502 by the service handler, and if not authenticated as determined at decision block 504, an error message is sent 506 to the service. If the service is successfully authenticated, the service handler parses and validates the XML document sent with the service request, as shown at block 508. The data in the service request is checked, and if the data is not correct as determined at decision block 510, an error message is sent 512 to the service.

If the data in the service request is correct, a ticket is created 514 based on the data sent in the request. The ticket is stored 516 in the persistent storage, and an XML (for example) document is created 518 that includes a ticket address or URL. The XML document including the ticket URL is then delivered 520 to the service as an HTTP response. At this point, a transaction may be performed to obtain the requested content.

Figure 6:
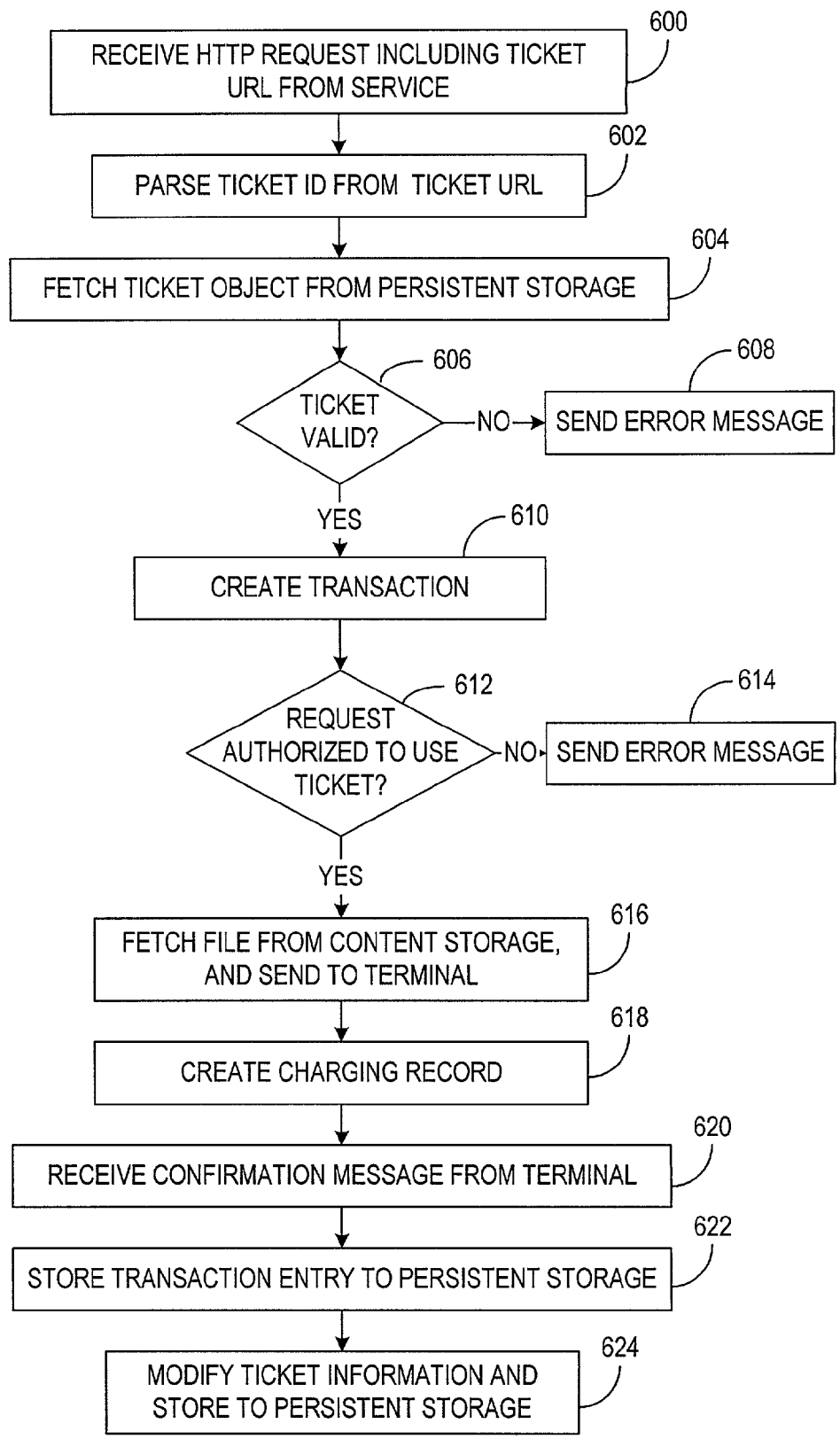
FIG. 6 is a flow diagram of an exemplary embodiment of actions performed by the transaction handler of the DLS.

FIG. 6 is a flow diagram of an exemplary embodiment of actions performed by the transaction handler of the DLS. When a transaction is performed, the transaction handler performs a variety of functions. At least one transaction request (e.g., an HTTP request), including the ticket URL provided by the service handler, is received 600 at the transaction handler. Download transactions may include one or more requests from the terminal to the transaction handler. The ticket URL is parsed 602 to obtain a ticket identifier (ticket ID) embedded therein. Using this ticket ID, the corresponding ticket object is fetched 604 from the persistent storage. The ticket is checked for validity, as shown at block 606. If the ticket is not valid, an error message is sent 608 to the service. If the ticket is valid, a transaction is created 610. It is determined 612 whether the received transaction request is authorized to use the ticket, and if not, an error message is sent 614 to the service. If the transaction request is authorized to use the ticket, DLS facilities are used to fetch 616 the file from content storage, and the file can then be sent to the requesting terminal. Charging may also be handled by the transaction handler, and a call for each request associated with the download transaction may be made to a charging handler to create 618 a charging record. The last request from the terminal may be provided by the terminal as a confirmation message, which is received 620 as an HTTP request pointing to a transaction identifier (transaction ID). This HTTP request is authorized and the transaction handler checks that this is a valid confirmation message from the terminal. The transaction entry is stored 622 to persistent storage.

The ticket is modified accordingly and stored to persistent storage, as shown at block 624. For example, a permitted download count, such as field 308 in the exemplary ticket 300 of FIG. 3, may be decremented to reflect the new number of permitted downloads. Other analogous fields of the ticket may be modified, such as when downloads are permitted. For example, an access parameter in the ticket may only allow one download in a given time period (e.g., one per day), and a corresponding ticket field may be modified accordingly. In another example, fields may be modified indicating which user or equipment identifiers can access downloadable content. These are representative examples of the types of modification of the ticket that may be performed, but the invention is clearly not limited to these examples. A variety of different access rights associated with a ticket may be modified accordingly.

As indicated above, download transactions may include one or more requests from the terminal to the transaction handler. In accordance with one embodiment of the invention, a first request received by the transaction handler from the terminal points to the ticket URL created and provided by the service handler. When the corresponding ticket has been fetched from the database, the transaction handler generates a transaction identifier (ID) for this transaction. This transaction ID can be used to identify'the transaction for subsequent requests from the terminal. Therefore, second and subsequent requests after the transaction has been generated point to the session (e.g., HTTP session) using the transaction ID, which is used to assign requests to the appropriate transaction. As indicated above, the session can be based on a variety of technologies, such as cookie technology, URL encoding, etc. When the last request related to the transaction is received, the transaction entry is added to the storage, and the ticket information is updated.

Figure 7:
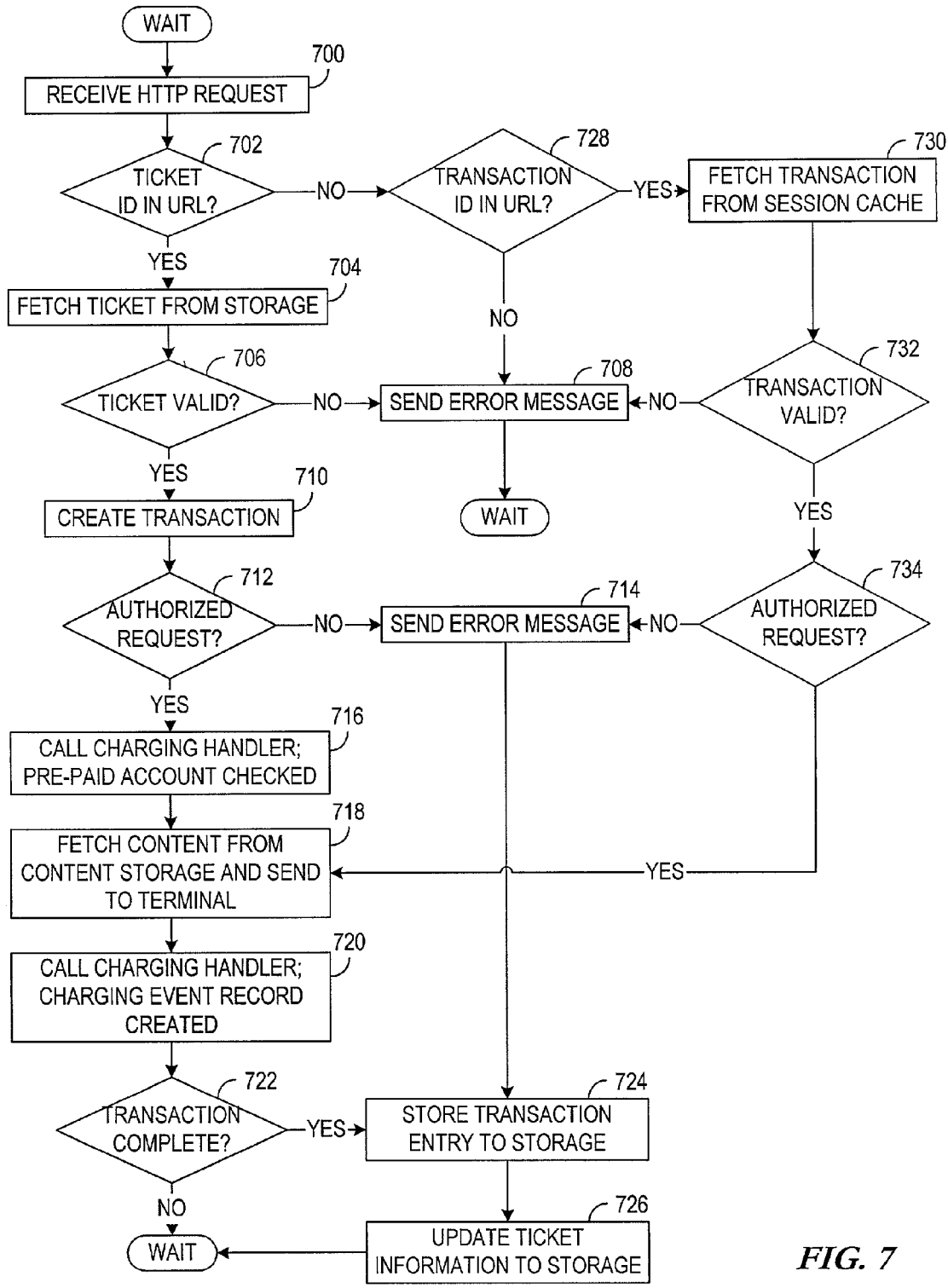
FIG. 7 is a flow diagram of one embodiment of the actions performed by the DLS transaction handler where multiple requests are associated with a transaction.

FIG. 7 is a flow diagram of one embodiment of the actions performed by the DLS transaction handler where multiple requests are associated with a transaction. This example assumes that the requests from the terminal are HTTP requests, although other suitable protocols may be similarly employed. An HTTP request is received by the transaction handler. If the request includes a ticket ID as determined at decision block 702, this indicates that this is the first request associated with this transaction in this illustrated embodiment. Using this ticket ID, the corresponding ticket is fetched 704 from the persistent storage. If the ticket is valid as determined at decision block 706, a transaction is created 710, otherwise an error message is sent 708. Once the transaction is created, it is determined 712 whether the request is authorized, and if not, an error message is sent 714.

Various charging mechanisms may be employed in connection with the present invention, including pre-paid, post-paid, direct pay, or other known payment methodologies. In the illustrated embodiment, a pre-paid charging methodology is assumed for purposes of illustration. If the request is found to be authorized at decision block 712, the charging handler is called 716 to check the user's pre-paid account. Assuming that the account is valid and includes the appropriate funds, the desired content is fetched 718 from the content storage and sent to the terminal. The charging handler is called 720 to create a charging event record, such as a call-detail record (CDR). If the transaction is complete as determined from the request, the transaction entry is stored 724 to persistent storage, and the ticket information is updated 726.

Upon receipt 700 of subsequent HTTP requests where a transaction has already been created, the ticket ID may not be in the URL, but rather a transaction ID may be included. The URL is checked 728 to determine whether a transaction ID is provided in the request, and if not, an error message is sent 708. If the URL includes a transaction ID, the corresponding transaction is fetched 730 from the session cache. The transaction is analyzed to determine whether it is valid, as shown at decision block 732. If it is not valid, an error message is sent 708. If it is valid, the request is checked 734 to determine whether it is valid, and if not, an error message is sent 714. If the request is valid, the desired content is fetched 718 from the content storage and sent to the terminal. Again, the charging handler is called 720 to create a charging event record. If the transaction is complete as determined from the request, the transaction entry is stored 724 to persistent storage, and the ticket information is updated 726. The last HTTP request related to the transaction may be used to identify that the transaction is completed, such as via a confirmation message associated with the request.

It should be recognized that the aforementioned embodiments are representative examples of the various access control principles described herein, and the invention is not limited to these illustrated embodiments.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. From the foregoing description of the illustrated embodiments, those of ordinary skill in the art will readily appreciate the applicability of the invention in any comparable network environment. Accordingly, the scope of the present invention should not be limited by the particular embodiments discussed above, but should be defined only by the claims set forth below and equivalents thereof.

What is claimed is:

1. A method for controlling download access of content from a download server to a mobile user terminal via a network, the network including at least a network service, the download server, and the mobile user terminal, the method comprising:
  receiving a download request from the network service, the download request including access information;
  creating a content rights file based on the access information;
  storing the content rights file;
  delivering to the network service an address of the content rights file for use by the mobile terminal;
  receiving a transaction request from the mobile user terminal;
  determining if the transaction request includes the content rights file address;
  if the transaction request includes the content rights file address:
    retrieving the content rights file using the content rights file address;
    authorizing a download transaction associated with a transaction identifier based on the content rights file; and
    downloading, from the download server to the mobile user terminal, the targeted content identified in the transaction request; and
  if the transaction request does not include the content rights file address and includes the transaction identifier:
    determining if the transaction is valid based on the transaction identifier;
    authorizing the download transaction if the transaction is valid; and
    downloading, from the download server to the mobile user terminal, the targeted content identified in the transaction request.

2. The method as in claim 1, wherein:
  creating the content rights file comprises creating the content rights file at the download server;
  storing the content rights file comprises storing the content rights file in storage in the download server; and
  retrieving the content rights file comprises retrieving the content rights file from the storage in the download server.

3. The method as in claim 1, wherein the access parameters comprise user-specific and access-specific parameters.

4. The method as in claim 3, wherein the access-specific parameters include content access rights identifying an access life cycle.

5. The method as in claim 4, wherein the access life cycle transcends user session boundaries.

6. The method as in claim 3, wherein the user-specific parameters include an identification of one or more users authorized to receive the content.

7. The method as in claim 1, further comprising receiving a confirmation message from the user terminal if the user terminal successfully receives the downloaded content.

8. The method as in claim 1, further comprising modifying the content rights file to reflect changes in access rights resulting from downloading the content.

9. The method as in claim 8, wherein modifying the content rights file to reflect changes in the access rights comprises decrementing a permitted download count.

10. The method as in claim 8, wherein modifying the content rights file to reflect changes in the access rights comprises adjusting an access parameter identifying when content may be downloaded.

11. The method as in claim 8, wherein modifying the content rights file to reflect changes in the access rights comprises modifying at least one of a user identifier and an equipment identifier to modify potential recipients of the content that may be downloaded.

12. The method as in claim 1, further comprising delivering an address of the content rights file to the network service upon creation of the content rights file.

13. The method as in claim 1, further comprising calling a charging element to create a charging record upon delivery of the content to the user terminal.

14. The method as in claim 1, wherein authorizing the content download comprises authorizing the content download to one or more user terminals.

15. The method of claim 1, wherein downloading the content comprises delivering the content via an XML document.

16. The method of claim 1, further comprising fetching the content from a content storage facility upon authorizing the content download.

17. The method of claim 1, further comprising executing the downloaded content to set configuration parameters of the user terminal.

18. The method of claim 17, wherein executing the downloaded content to set the configuration parameters comprises setting the configuration parameters to enable the user terminal to access new or upgraded network services.

19. A download server for controlling access to downloadable content to a mobile terminal via a network, comprising:
  a service handler configured to receive a content download request including access information from a network service, the service handler configured to create and store a content rights file based on the access information and deliver to the network service an address of the content rights file for use by a mobile terminal; and
  a transaction handler configured to receive a transaction request from the mobile terminal, determine if the transaction request includes the content rights file address, the transaction handler configured to, if the transaction request includes the content rights file address, retrieve the content rights file using the content rights file address, authorize a download transaction associated with a transaction identifier based on the content rights file, and download targeted content identified in the transaction request to the mobile terminal, the transaction handler further configured to, if the transaction request does not include the content rights file address but includes the transaction identifier, determine if the transaction is valid based on the transaction identifier, authorize the download transaction if the transaction is valid and download targeted content identified in the transaction request to the mobile terminal.

20. The download server as in claim 19, wherein the transaction handler is further configured to fetch the targeted content identified in the transaction request from a content storage facility.

21. The download server as in claim 19, further comprising a charging handler to call a charging facility to create a charging record upon delivery of the targeted content to the mobile terminal.

22. The download server as in claim 19, wherein the transaction handler is configured to update the content rights file after the transaction is complete.

23. The download server as in claim 19, wherein the content rights file identifies a number of times in which the download transactions have been authorized.

24. The download server as in claim 19, wherein the content rights file identifies at what times the download transactions have been authorized.

25. The download server as in claim 19, wherein the content rights file comprises an end-user identification to identify the end-users to which the targeted content associated with the download transaction has been authorized.

26. The download server as in claim 25, wherein the end-user identification comprises a user name.

27. The download server as in claim 25, wherein the end-user identification comprises a user terminal identifier.

28. The download server as in claim 27, wherein the user terminal identifier is a Mobile Station ISDN/PSTN Number (MSISDN).

29. The download server as in claim 19, wherein the download server provides the transaction identifier to the terminal via a cookie.

30. The download server as in claim 19, wherein the download server provides the transaction identifier to the terminal via URL encoding.

31. A transaction hander coupled to a mobile terminal via a network, the transaction handler configured to receive a transaction request from the mobile terminal, determine if the transaction request includes a content rights file address, the transaction handler configured to, if the transaction request includes the content rights file address, retrieve a content access file using the content rights file address, authorize a download transaction associated with a transaction identifier based on the content rights file, and download targeted content identified in the transaction request to the mobile terminal, the transaction handler further configured to, if the transaction request does not include the content rights file address but includes the transaction identifier, determine if the transaction is valid based on the transaction identifier, authorize the download transaction if the transaction is valid and download targeted content identified in the transaction request to the mobile terminal.

32. The transaction handler as in claim 31, wherein the transaction handler is further configured to fetch the targeted content identified in the transaction request from a content storage facility.

33. The transaction handler as in claim 31, wherein the transaction handler is configured to update the content rights file after the transaction is complete.

34. The transaction handler as in claim 31, wherein the transaction handler further comprises a charging handler to call a charging facility to create a charging record upon delivery of the targeted content to the mobile terminal.

35. A computer readable medium having computer-executable instructions for controlling access to downloadable content available via a network service, the computer-executable instructions performing a method, comprising:
  receiving a download request from the network service, the download request including access information;
  creating a content rights file based on the access information;
  storing the content rights file;
  delivering to the network service an address of the content rights file for use by the mobile terminal;
  receiving a transaction request from the mobile user terminal;
  determining if the transaction request includes the content rights file address;
  if the transaction request includes the content rights file address:
    retrieving the content rights file using the content rights file address;
    authorizing a download transaction associated with a transaction identifier based on the content access file; and
    downloading, from the download server to the mobile user terminal, the targeted content identified in the transaction request; and
  if the transaction request does not include the content rights file address and includes the transaction identifier:
    determining if the transaction is valid based on the transaction identifier;
    authorizing the download transaction if the transaction is valid; and
    downloading, from the download server to the mobile user terminal, the targeted content identified in the transaction request.

36. The computer readable medium as in claim 35, wherein:
  creating the content rights file comprises creating the content rights file at the download server;
  storing the content rights file comprises storing the content rights file in storage in the download server; and
  retrieving the content rights file comprises retrieving the content rights file from the storage in the download server.

37. The computer readable medium as in claim 35, wherein the access information comprises user-specific and access-specific parameters.

38. The computer readable medium as in claim 37, wherein the access-specific parameters include content access rights identifying an access life cycle.

39. The computer readable medium as in claim 38, wherein the access life cycle transcends user session boundaries.

40. The computer readable medium as in claim 37, wherein the user-specific parameters include an identification, by name, of one or more users authorized to receive the content.

41. The computer readable medium as in claim 35, further comprising receiving a confirmation message from the user terminal if the user terminal successfully receives the downloaded content.

42. The computer readable medium as in claim 35, further comprising modifying the content rights file to reflect changes in access rights resulting from downloading the content.

43. The computer readable medium as in claim 42, wherein modifying the content rights file to reflect changes in the access rights comprises decrementing a permitted download count.

44. The computer readable medium as in claim 35, further comprising calling a charging element to create a charging record upon delivery of the content to the user terminal.

45. The computer readable medium of claim 35, further comprising fetching the content from a content storage facility upon authorizing the content download.

* * * * *

UNITED STATES PATENT AND TRADEMARK OFFICE
CERTIFICATE OF CORRECTION

PATENT NO. : 7,191,216 B2  Page 1 of 1
APPLICATION NO. : 09/970530
DATED : March 13, 2007
INVENTOR(S) : Mattila et al.

It is certified that error appears in the above-identified patent and that said Letters Patent is hereby corrected as shown below:

Title Page;
<u>In the Inventors list (75):</u>

Page 1: "Seven Eerola" should read --Severi Eerola--.

Page 1: "Jyri Jokinen, Tempere (FI)" should read --Jyri Jokinen, Tampere (FI) --.

<u>In the Specification:</u>

Col. 6, line 29: "record the details" should read --a record of the details--.

Col. 7, line 4: "the identify of the end-user" should read --the identity of the end-user --.

Col. 11, line 14: "to identify' the transaction" should read --to identify the transaction --.

Col. 11, line 51: "as determined from the request" should read --as determined 722 from the request --.

Col. 12, line 1: "determined from the request," should read --determined 722 from the request --.

<u>In the Claims:</u>

Col. 15, line 21;

Claim 31, line 1: "hander" should be --handler--.

Signed and Sealed this

Tenth Day of July, 2007

JON W. DUDAS
*Director of the United States Patent and Trademark Office*